United States Patent [19]

Picandet

[11] Patent Number: 4,621,170

[45] Date of Patent: Nov. 4, 1986

[54] MEANS OF TRANSMITTING SIGNALS ALONG A LINE WHILE ALSO PROVIDING A DIRECT VOLTAGE SOURCE

[75] Inventor: Jean A. Picandet, Paris, France

[73] Assignee: Jeumont-Schneider Corporation, Puteux, France

[21] Appl. No.: 451,945

[22] Filed: Dec. 21, 1982

[30] Foreign Application Priority Data

Dec. 23, 1981 [FR] France .................. 81 24064

[51] Int. Cl.[4] ........................................... H04Q 5/18
[52] U.S. Cl. .................. 370/24; 340/310 A; 379/90
[58] Field of Search ........ 179/16 AA, 70, 77, 18 AD, 179/99 M, 18 FA; 370/29, 32, 24, 78; 307/1, 4

[56] References Cited

U.S. PATENT DOCUMENTS

| | | | |
|---|---|---|---|
| 3,718,762 | 2/1973 | Nezu et al. | 375/36 |
| 3,721,763 | 3/1973 | Homan et al. | 370/29 |
| 4,046,959 | 9/1977 | Watanabe et al. | 370/24 X |
| 4,118,603 | 10/1978 | Kumhyr | 179/16 A |
| 4,125,749 | 11/1978 | Kinoshita et al. | 179/99 M |
| 4,171,467 | 10/1979 | Evanchik | 370/29 X |
| 4,173,714 | 11/1979 | Bloch et al. | 370/24 X |
| 4,286,120 | 8/1981 | Sublette | 179/90 K |
| 4,326,287 | 4/1982 | Abramson | 370/29 |
| 4,376,876 | 3/1983 | Versteeg et al. | 179/77 |
| 4,477,896 | 10/1984 | Aker | 370/24 |

FOREIGN PATENT DOCUMENTS

| | | | |
|---|---|---|---|
| 1437031 | 5/1976 | United Kingdom . | |
| 2075314 | 11/1981 | United Kingdom | 370/32 |

Primary Examiner—Gene Z. Rubinson
Assistant Examiner—R. Vaas
Attorney, Agent, or Firm—Shapiro and Shapiro

[57] ABSTRACT

A transmission configuration between a main station and a local station consists of a line which permits supplying of direct voltage power for stations from a source within the main station. A rectifier bridge is installed in such a manner that suitable polarization of the receiver can be achieved, regardless of the branching direction for wires comprising the line. Groups of unipolar current impulses are superimposed upon the supply voltage along the line by two generator units ($K_{44}$, 40 and $K_{50}$, 46) within the main station and a generator ($K_{102}$, 100) within the local station. The respective polarities of impulses sent to and from the main station and the local station are such that said impulses can flow through rectifier bridges within local stations.

6 Claims, 5 Drawing Figures

MEANS OF TRANSMITTING SIGNALS ALONG A LINE WHILE ALSO PROVIDING A DIRECT VOLTAGE SOURCE

The present invention pertains to transmission of information, specifically in the form of digital signals, between a main station and a local station. In particular, this invention concerns means of providing connections between stations by a pair of wires which can simultaneously permit supplying of direct voltage for local stations from the main station, as well as transmission of the aforementioned digital signals.

Configurations which operate in accordance with this principle, namely for two-way transmission of information between a main station and a local station, are frequently used in telephone systems, particularly for so-called private telephone exchanges. Within these configurations, an automatic switching unit connected to multiple local stations or subscriber extensions by respective telephone lines performs the functions of a main station.

Within the aforementioned stations or extensions, a source of electric power is necessary for operation of the transmitter and, ultimately, for operation of related components of the telephone unit per se. Usually, there is no internal source of power, and the power supply is directly maintained by polarization of the telephone line or pair by means of a single voltage source located within the automatic switching unit.

Furthermore, specifications for exchanges often render it necessary for proper polarization of local stations to be provided by means of the telephone line itself, regardless of the branching directions for wires comprising the line. Accordingly, a means of rectification, such as a diode bridge, is placed below the connection point for these wires, usually within the local station, so as to fulfill the previously cited requirement.

In order to achieve two-way communication, transmission of coded signals takes place in an alternating form according to both directions along the line, by means of groups of impulses representing binary units. Conversation is regulated by means of appropriate techniques for communication via time channels, in such a way as to provide users with an impression of simultaneous two-way transmission, while also ensuring required signalling functions, in addition to the customary conversation functions.

Previously developed systems of this type rely upon transmission of bipolar impulses, which are usually symmetrical, along each wire within the line, with use of a code whereby the average for levels within groups of successive impulses along each wire shall be zero. Impulses are introduced at the inlet for each of the wires within a pair, and they are detected at the outlet by means of respective insulating transformers. A capacitor situated at a midpoint, within the winding connected to the line of each transformer, permits by-passing of wires in relation to one another at each end. Continuous voltage supplied to local stations is introduced at the main station, on either side of the aforementioned capacitor. Voltage is obtained from the terminals of a by-pass capacitor installed within the input transformer for a given local station, and it is transmitted to the rectifier bridge in order to permit proper polarization of stations, regardless of the branching directions for wires within specific pairs. The second winding within each transformer is likewise situated at a midpoint, and it is used in conjunction with the winding for the line in order to transmit and to receive the alternating bipolar code which is carried along both wires within the line by means of symmetrical signals.

In addition, a control logic is required for converting the message units which must be transmitted into a bipolar code, in order to permit regulation of a voltage generator connected to the transmitter winding. It is also necessary to provide a decoder at the outlet for the receiver winding, in order that incoming signals may be reconverted into the customary digital form. Obviously, a configuration of this type is necessary at each local station and at the main station, for each point of entry for lines originating at local stations.

Consequently, it is necessary to provide large numbers of these units, which are technically complex and costly. Moreover, they are cumbersome and heavy, on account of the transformers which are required.

A specific purpose of the present invention is to eliminate these difficulties by permitting signal transmission functions between the main station and local stations to be completed on a line whereby power for local stations can be remotely supplied in a simpler and less expensive form.

Accordingly, the present invention specifically concerns a communications system of the type which consists of a main station, at least one local station, a connecting line for the main station and the local station which consists of paired wires in order to permit supplying of direct voltage for local stations from the main station, at least one generator unit at either station in order to introduce digital signals within the power supply line, and at least one detector at the other station, in order to detect digital signals travelling along the line, characterized by the fact that said generator unit is capable of transmitting groups of unipolar impulses along the line, whereas the previously cited detector is connected to the line and is capable of detecting changes in line polarity according to the direction for impulses originating from the generator unit.

The unipolar impulses which are to be transmitted therefore represent a direct translation of digital units which must be transmitted, without it being necessary to rely upon procedures for converting bipolar codes.

The present invention is derived from the observation that, in technical terms, it is possible to achieve transmission of digital signals along a remotely supplied line by directly feeding unipolar impulses onto the line. In previously developed systems, use of groups of unipolar impulses was prevented by the fact that they contain an average continuous component which would prevent functioning of the transformers used to provide this type of superimposition. As has been indicated heretofore, it was therefore necessary to make use of signal codes which tended to reduce the average component to zero. Nevertheless, it has been determined that it is possible to provide configurations without transformers, whereby one can eliminate or minimize the effects of the continuous component upon series of impulses being transmitted so that they are superimposed upon the polarization introduced within a pair of wires. It is preferable for transmission of impulses to take place in a symmetrical form along each wire. In this regard, the invention is applicable in a particularly advantageous form when the information which must be transmitted consists of groups of alternating impulses at brief intervals, with transmission in either direction along the line, whereby groups of impulses transmitted in one direction shall possess an opposite polarity in relation to those being transmitted in the other direction. Hence, it is preferable for impulses transmitted in each direction to possess equal amplitudes in absolute terms.

Within this context, unipolar impulses should be understood as impulses having the same polarity within a series or group of successive impulses being propagated in a given direction along the line. Polarity is determined in relation to the nominal potential difference for wires within the line. Hence, transmission of unipolar impulses along the line continues to occur in situations where these impulses are derived from simultaneous routing of impulses with opposite polarities along each wire comprising a pair.

According to one application of the invention, an impedance, namely a resistance, is provided at the end of each wire for the line at a location above the point of origin for signals transmitted by the generator unit for the respective station and at a location below the point for detecting signals at the other station. Impedance levels are defined so as to provide optimal conditions for propagating impulses along the wires for each pair, and the impedance level can be considered equivalent to half of the characteristic line impedance for the transmission frequency for impulses.

It is advantageous to provide impedances by means of thermistors within the main station, in order to ensure protection of the main station in the event of short circuits within the line.

According to a preferred version of the present invention, it is possible to introduce current impulses whose characteristics can be easily regulated by simple methods, especially in order to ensure that impulses travelling along each wire shall be symmetrical. It is also preferable to use a differential amplifier to detect impulses arriving at the other end of the line. The amplifier inlets can be polarized with a suitable voltage for reducing the effects of the continuous component for groups of impulses which are polarized so as to be detectable by the amplifier.

The advantages of the present invention are particularly noteworthy in situations where a rectifier unit has been provided in order to ensure proper polarization of the local station in all instances. In order to ensure transmission of unipolar impulses in both directions through a rectifier unit of this type, it is actually possible to adopt measures whereby the generator units within the main station shall produce impulses which tend to increase the voltage between wires comprising a pair, whereas the generator units located at the local station shall tend to reduce the voltage. In this way, unipolar impulses can be transmitted in all instances, whatever the propagation direction may be.

The present invention also pertains to a main station, for example for an automatic switching unit intended for this purpose within a configuration of the type which has been described heretofore. The invention also pertains to a local station, for example for a subscriber extension which has been adapted for this purpose.

The explanations and the description of a nonrestrictive example appearing hereinafter are provided in relation to the accompanying illustrations, wherein.

Figure 1:
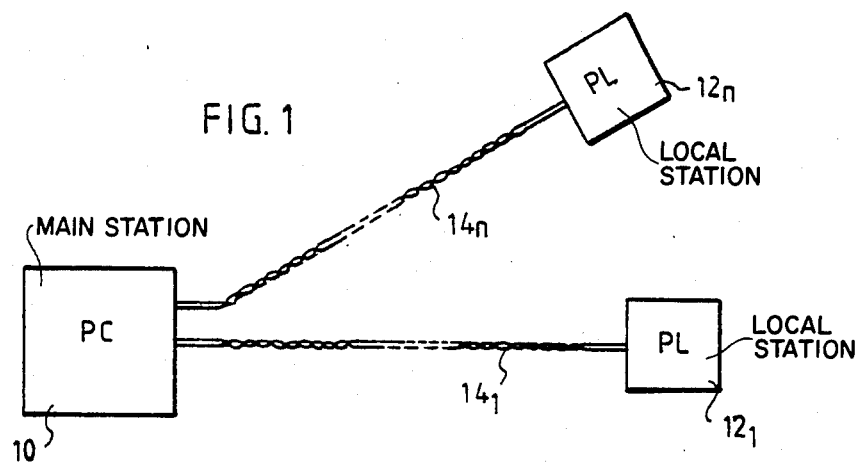
FIG. 1 is a basic diagram for a configuration within which the present invention is applicable.

A telephone configuration (FIG. 1) includes a central station, or an automatic switching unit (10), which is connected to a series of local stations (12), respectively identified as ($12_1$) through ($12_n$) by means of telephone lines, respectively identified as ($14_1$) through ($14_n$). Each line consists of a pair of wires, as is customary for this type of installation.

The automatic switching unit (10) ensures interconnection of local stations with one another, and, at the same time, interconnection of these stations with an outside telephone system. Local stations ($12_1$ to $12_n$) can not only consist of simple telephone sets for spoken messages, but can constitute individual subscriber stations which, in addition to the customary equipment for transmitting and receiving sounds, can include suitable peripheral units for displaying information and for numeric transmission of data directly onto keyboards. In this type of system, in its conventional form, data is transmitted along the lines ($14_1$ to $14_n$) in an entirely digital form and in both directions. This is true not only for sound signals which are converted into digital signals, but for all signals which may be appropriate for completing calling functions, for illuminated displaying of specific signals, and, ultimately, for recording data concerning charges.

In addition to these transmission functions, the lines ($14_1$ to $14_n$) permit supplying of direct voltage for each local station ($12_1$ to $12_n$) from the main station (10).

For this purpose, the main station or central unit (FIGS. 2 and 3) includes a source of direct voltage (20), with levels which can be as high as forty volts, for example. The positive pole (22) is connected through a resistor ($R_{24}$) to a junction (26), in order that signals may be fed to a given wire (31) within the line (14). Similarly, the negative pole (28) for the voltage source (20) is connected through a resistor ($R_{30}$) to a junction (32), in order that signals may be fed to another wire (33) within the same line (14).

A constant current generator (40) is connected between a terminal (42) receiving a stronger positive voltage than that of the pole (22) and an analog gate ($K_{44}$) which connects the generator to the input terminal (26) when it is in an open position. The aforementioned gate is controlled by a transmitting device which does not appear in the diagram. In a similar manner, a constant current generator (46) is connected between a terminal (48) receiving a stronger negative voltage than that of the pole (28) for the source (20) and the junction (32) by means of an analog gate ($K_{50}$) which is controlled by the previously cited transmitting device.

Figure 2:
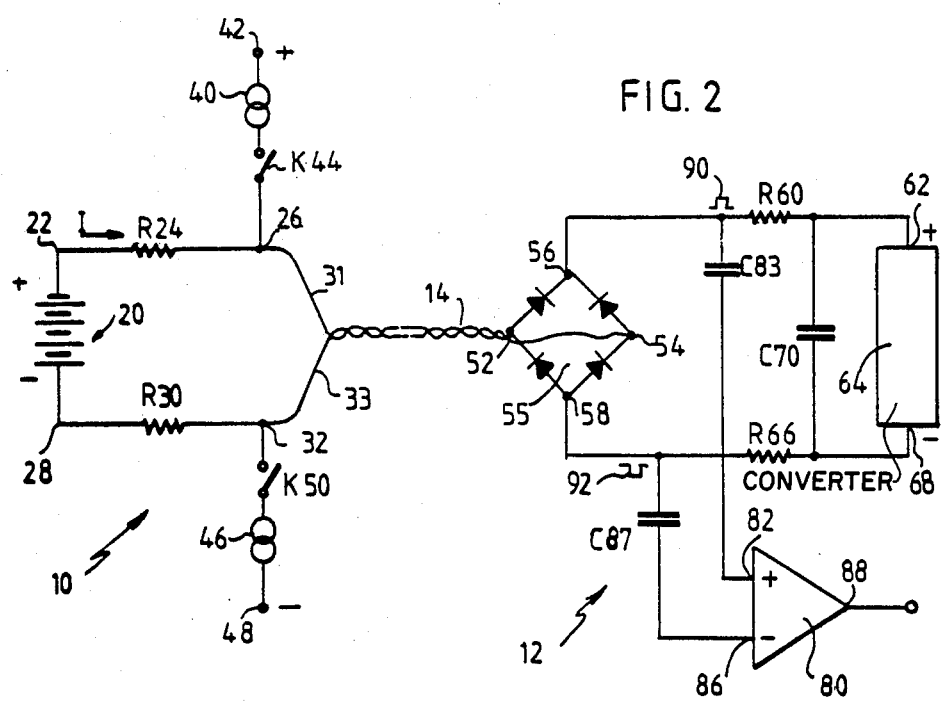
FIGS. 2 and 3 are circuit diagrams which represent means of communication between a main station and a local station respectively, for transmission of messages from the former station to the latter, and vice versa.

Each of the wires (31, 33) within the pair (14) which is schematically shown in a twisted form within FIG. 2, ends at one of the input junctions (52, 54) of a rectifier bridge with diodes (55) situated at the point of entry for the local station (12). By means of one of the resistors ($R_{60}$), an output (56) for the rectifier bridge (55) is connected to an input terminal (62) on a converter (64), for example the positive terminal. Another output (58) for the bridge (55) is connected by means of a resistor ($R_{66}$) to another input terminal (negative) on the converter (64). The aforementioned converter locally provides the various voltages required for operation of the local station (12), such as power for the transmitter and for any auxiliary components of the telephone set per se. A capacitor ($C_{70}$) is connected between the terminals (62, 68) of the converter (64), so that, in conjunction with the resistors ($R_{60}$, $R_{66}$), it can constitute a low-pass filter which prevents impulses from reaching the converter (64).

The output terminals (56, 58) of the rectifier bridge (55) are constantly polarized in the same manner, regardless of the branching direction for wires (31, 33) within the pair (14) in relation to the inputs (52, 54). In this manner, the line (14) permits remote supplying of power for the local station (12) with the required polarity for functioning of the converter (64), so that labelling of wires (31, 33) is not necessary in order to provide branching in the desired direction.

A positive inlet (82) for a differential amplifier (80) for output (88) is connected to an outlet (56) for the bridge (55) by means of a capacitor ($C_{83}$) in order to permit detection of impulsing signals transmitted from the main station (10) to the local station (12). In turn, a negative input (86) for the amplifier (80) is connected to an output for the bridge (55) by means of another capacitor ($C_{87}$).

The circuitry for each wire within a pair is arranged in a symmetrical form. In particular, the resistance values for resistors ($R_{24}$, $R_{30}$) are equal to one another, and each value is equal to half of the characteristic impedance for the line (14) according to the transmission frequency for digital impulses between the stations (10, 12). The resistors identified as ($R_{60}$) and ($R_{66}$) are likewise identical to one another, according to the aforementioned impedance level. The capacitors ($C_{83}$, $C_{87}$) possess identical capacities, and currents produced by the current generators (40, 46) possess the same amplitudes.

Hence, during operation of the system, when the unit for transmission of messages from the central station (10) to a local station (12) is activated in order to transmit a series of binary units, the analog gates ($K_{44}$, $K_{50}$) are simultaneously closed for the duration of each binary unit with a logic value of 1, and, otherwise, they remain open, so as to create a stream of unipolar current impulses which is propagated along the line (14). Each impulse is composed of two simultaneous current peaks having the same amplitudes and opposite polarities, along wires (31) and (33) respectively. In this manner, it is possible to eliminate emission of radiation by the line as a result of propagation of impulses. Moreover, this configuration, on account of its symmetrical structure, is not susceptible to the presence of external radiation.

The current peaks which are produced each time that the analog gates ($K_{44}$, $K_{50}$) shut are superimposed upon polarization from remote supplying of power to the line (14), and they tend to increase the voltage derived from remote supplying of power. Consequently, they can be transmitted through the diode bridge (55) without difficulty. On account of the by-pass capacitor ($C_{70}$), unipolar voltage peaks which are generated in this manner have practically no effect upon the converter (64). On the other hand, they can be transmitted through the capacitors ($C_{83}$, $C_{87}$), which provide blocking of the continuous component for remotely supplied power at the outputs (56, 58). The polarity of the voltage peaks which have been cited heretofore and are schematically represented within FIG. 2 by the reference numbers (90) and (92) tends to produce a voltage differential between the inlets (82, 86) of the differential amplifier (80), so that a positive logic impulse is produced at the outlet (88), beginning with the resting level. The digital signals which consist of variations in the output level as a result of impulses detected in this manner by the amplifier (80) are processed in relation to the information which they transmit to local stations (12) by means of appropriate decoding circuits.

Figure 3:
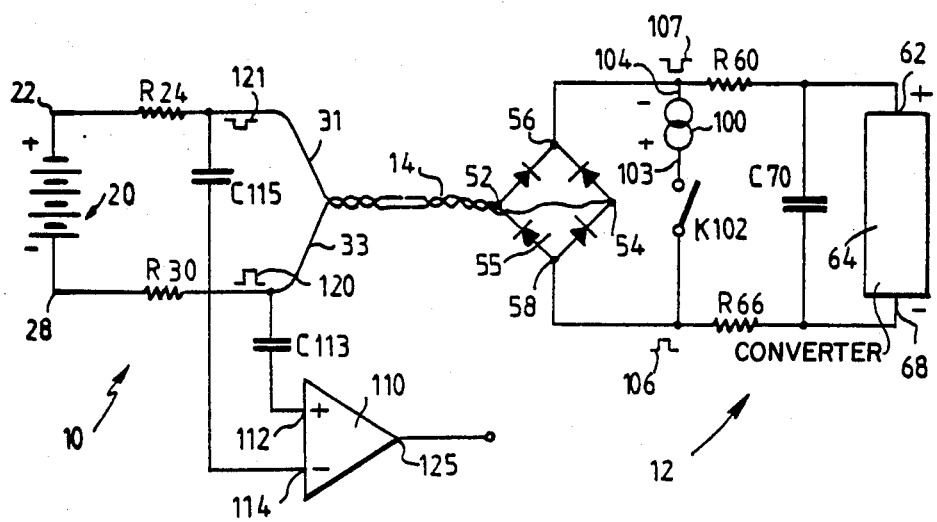

The configuration appearing within FIGS. 2 and 3 is capable of two-way transmission of messages between the main station (10) and a local station (12). For this purpose, the local station (12) also includes transmitting devices for generating groups of unipolar impulses which are transmitted to the main station (10) along the line (14), with the main station possessing means of detecting these impulses. As is customary for transmission by means of time channels, the control systems for the main station (10) and for the local station (12) are designed so as to allow alternating transmission of groups of impulses in either direction along the telephone line (14). Thus, whenever transmission of impulses in a given direction takes place, there is a subsequent interval, followed by transmission of impulses in the opposite direction.

In order to permit a more clear explanation, the components described in accordance with FIG. 2, which permit transmission from a main station to a local station, have been deleted from FIG. 3. In contrast, the components which permit transmission in the opposite direction do appear. A series connection consisting of a constant current generator (100) followed by an analog gate ($K_{102}$), with closing of said gate being controlled by operation of a transmitter device for the local station (12), which does not appear in the diagram, is situated between the terminals (56, 58) of the bridge (55). The terminals (103, 104) of the aforementioned generator (100) are branched, as indicated by + and − symbols, so as to allow a current to flow through the analog gate ($K_{102}$) when it is closed in the direction extending from terminal (56) to terminal (58). The amplitude of this current is preferably equal to the amplitude of currents produced by the generator units designated as (40) and (46). In effect, this particular generator unit permits charging of the rectifier bridge (55) below which it is situated, in terms of the direction in which power is being supplied. The reference numbers (106) and (107) are used to identify voltage peaks which correspond to each opening and shutting sequence of the analog gate ($K_{102}$). These peaks, which are associated with a temporary voltage drop between the terminals identified as (56) and (58), possess equal amplitudes and opposite polarities. Thus, they can be propagated in a symmetrical form toward the main station (10), through the bridge (55) and along respective wires within the line (14). On account of the by-pass capacitor ($C_{70}$), these voltage peaks have practically no effect upon the converter (64). Moreover, they effect the detector amplifier (80) for the local station (12) in such a manner that the amplifier outlet (88) can be maintained at a zero logic level.

Unipolar pulse streams originating from the transmitter for the local station (12) are detected at the main station (10) by a differential amplifier (110) with a positive inlet (112) which is connected to a wire (33) within a pair, between the line (14) and the resistor ($R_{30}$), through a capacitor ($C_{113}$), whereas the negative inlet (114) is connected to the wire identified as (31), between the line (14) and another resistor ($R_{24}$). The peaks which appear within the diagrams as waves (120, 121) at the inlets for the capacitors ($C_{113}$, $C_{115}$) function in a differential form according to increases in voltage between inputs (112, 114). A logic signal with a value of 1 therefore emanates from the outlet (125) of the amplifier (110), in response to each corresponding impulse. In contrast (FIG. 2), impulses transmitted by the current generators (40, 46) during periods of transmission from the main station to the local station function so that the outlet (125) of the amplifier (110) tends to be maintained at a zero logic level.

The amplifiers (80, 110) therefore permit oneway detection of groups of impulses transmitted in one direction along wires within the line (14), by eliminating possible interference with impulses transmitted in the opposite direction along paired wires within the line. In addition, it is possible to polarize the inlets for each of the differential amplifiers (80, 110) so as to provide a voltage bias which prevents them from being affected by the average continuous component generated by each group of impulses during the transmission period. In this way, it is possible to obtain reliable and distinct interruption of output signals in response to each impulse of the type which is to be detected, for the entire duration of each respective pulse stream. The average component can be minimized on account of the intervening period and transmission of the next unipolar group in an opposite direction along the line, with an opposite polarity.

At each station, on account of resistors ($R_{24}$, $R_{30}$) at the main station and resistors ($R_{60}$, $R_{66}$) at the local station, and especially as a result of appropriate selection of resistance levels in relation to line impedance, impulses transmitted by the line are absorbed by the resistors at each station without causing retransmission of echoes which would hamper reliable transmission of messages along the line. Hence, this feature permits establishment of favorable conditions for direct routing of unipolar numerical signals superimposed upon direct voltage supplied along the same line. Moreover, it is advantageous to provide resistors ($R_{24}$, $R_{30}$) which are thermistors with positive temperature coefficients, in order to limit the current in the event of short circuits affecting wires (31, 33) within the line (14).

The analog gates ($K_{44}$, $K_{50}$, $K_{102}$) are usually open, and closing of these gates permits symmetrical impulses to be transmitted along the line (14) in a given direction in order that they may pass through the diode bridge (55).

Figure 4:
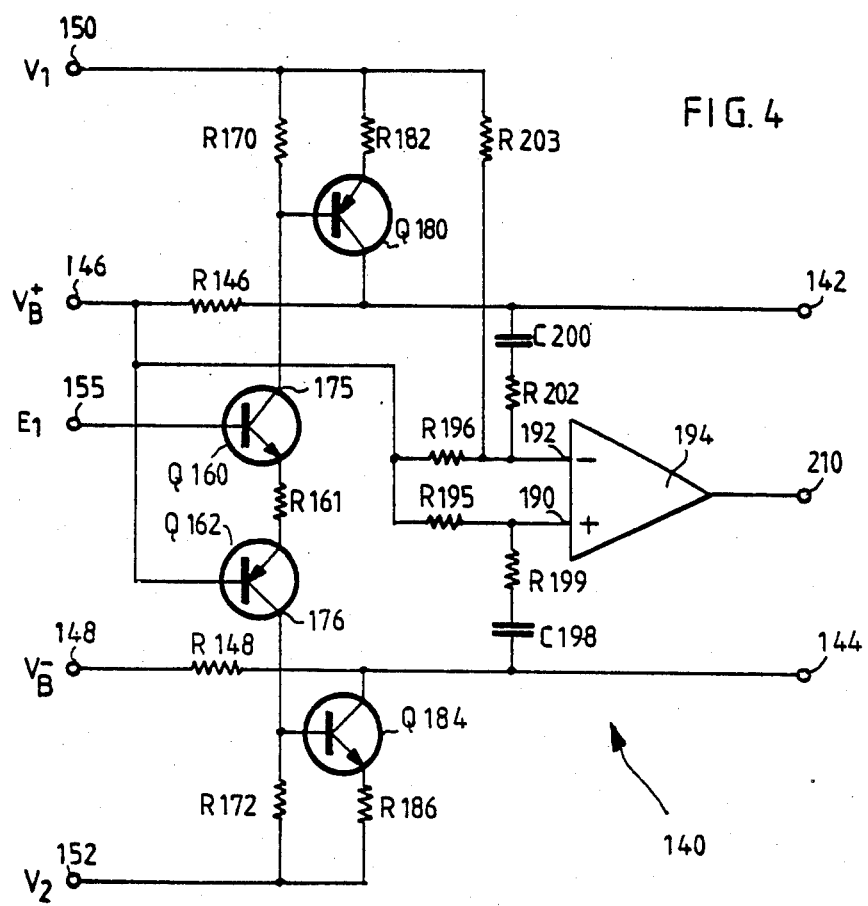
FIG. 4 is a diagram indicating circuits within a main station which can be used for application of the invention.

In one version of a module (140) (FIG. 4) for connecting a main station to a telephone line which is connected to terminals identified as (142, 144), two resistors ($R_{146}$, $R_{148}$) which are identical to the resistors identified as ($R_{24}$) and ($R_{30}$) are respectively installed between terminal (142) and a connecting terminal (146) for the positive pole ($V_{B+}$) of a direct current source, on the one hand, and between terminal (144) and another terminal (148) connecting the module to the negative pole ($V_{B-}$) for the same source. The module includes a connecting terminal (150) for one of the poles of a source ($V_1$) which provides a voltage several volts higher (logic level) than the voltage identified as ($V_{B+}$), and a connecting terminal (152) for a source ($V_2$) which provides a voltage which is less than the voltage identified as ($V_{B-}$) by essentially the same number of volts. In addition, the module contains an inlet (155) which can be connected to a signal source ($E_1$) controlling the base of an NPN transistor ($Q_{160}$) whose emitter is connected by a resistor ($R_{161}$) to the emitter of a PNP transistor ($Q_{162}$) whose base is polarized by the voltage identified as ($V_{B+}$). The collector (175) of the former transistor ($Q_{160}$) is connected by a resistor ($R_{170}$) to a terminal (150), and the collector (176) of the latter transistor ($Q_{162}$) is connected by a resistor ($R_{172}$) to another terminal (152), with the same level being maintained for resistors identified as ($R_{170}$ and $R_{172}$). The collector (176) of the second transistor ($Q_{162}$) controls the base of an NPN transistor ($Q_{184}$) whose collector is connected to the line terminal (144), whereas the emitter is connected by a resistor ($R_{186}$) to the terminal identified as (152). The resistors identified as ($R_{182}$) and ($R_{186}$) are equivalent. When the potential of the terminal identified as (155) is equal to $V_{B+}$, hardly any current flows through the transistors ($Q_{160}$, $Q_{162}$, $Q_{180}$, and $Q_{184}$). When a voltage peak greater than $V_{B+}$ is applied at this terminal (155), one of the transistors is activated so that the current can flow between the terminals identified as (150) and (152), through the resistors ($R_{170}$, $R_{161}$, $R_{172}$). Inasmuch as the gain is relatively high for the transistors identified as ($Q_{160}$) and ($Q_{162}$), the same current flows through the three resistors. Under these conditions, base voltages for the transistors identified as ($Q_{180}$) and ($Q_{184}$) are the same, so that essentially equal currents with opposite polarization can flow toward the terminals for the lines identified as (142) and (144).

The power supply terminal (146) is also connected to positive (190) and negative (192) inlets for a differential amplifier (194) through respective resistors ($R_{195}$, $R_{196}$). In addition, the inlet identified as (192) is connected to the line terminal (142) by means of a capacitor ($C_{200}$) and a resistor ($R_{202}$) which are series-connected, and the inlet (190) is connected to the line terminal 144 by means of a capacitor ($C_{198}$) and a resistor ($R_{199}$) which are series-connected. Lastly, the negative inlet (192) is also connected to the terminal identified as (150) (voltage $V_1$) by means of a resistor ($R_{203}$) which, in conjunction with the resistor identified as ($R_{196}$), forms a potential divider which permits voltage for the negative inlet (192) of the amplifier (194) to remain at a level between $V_{B+}$ and $V_1$. The level of resistance obtained from parallel connection of the resistors identified as ($R_{196}$) and ($R_{203}$) is equal to the level for the resistor identified as ($R_{195}$) as a result of symmetry.

In this way, current impulses transmitted to the terminals (142, 144) by the transistors identified as ($Q_{180}$) and ($Q_{184}$) do not modify the output level (210) for the amplifier (194), which remains at zero. On the other hand, if symmetrical impulses are received by the terminals (142, 144) in a form which tends to reduce the voltage for these terminals, differential signals transmitted by the capacitors ($C_{198}$, $C_{200}$) can possess sufficient amplitude, by virtue of the polarization created by the potential divider ($R_{203}$, $R_{196}$), so that the voltage between the inlets (190, 192) of the amplifier (194) shall be positive, with a corresponding impulse being emitted at the amplifier outlet (210). The level of positive polarization established at the inlet (192) by the potential divider ($R_{203}$, $R_{196}$) is selected so as to prevent unipolar impulses from affecting the amplifier (194) as a result of effects of direct components upon each wire within the line.

Figure 5:
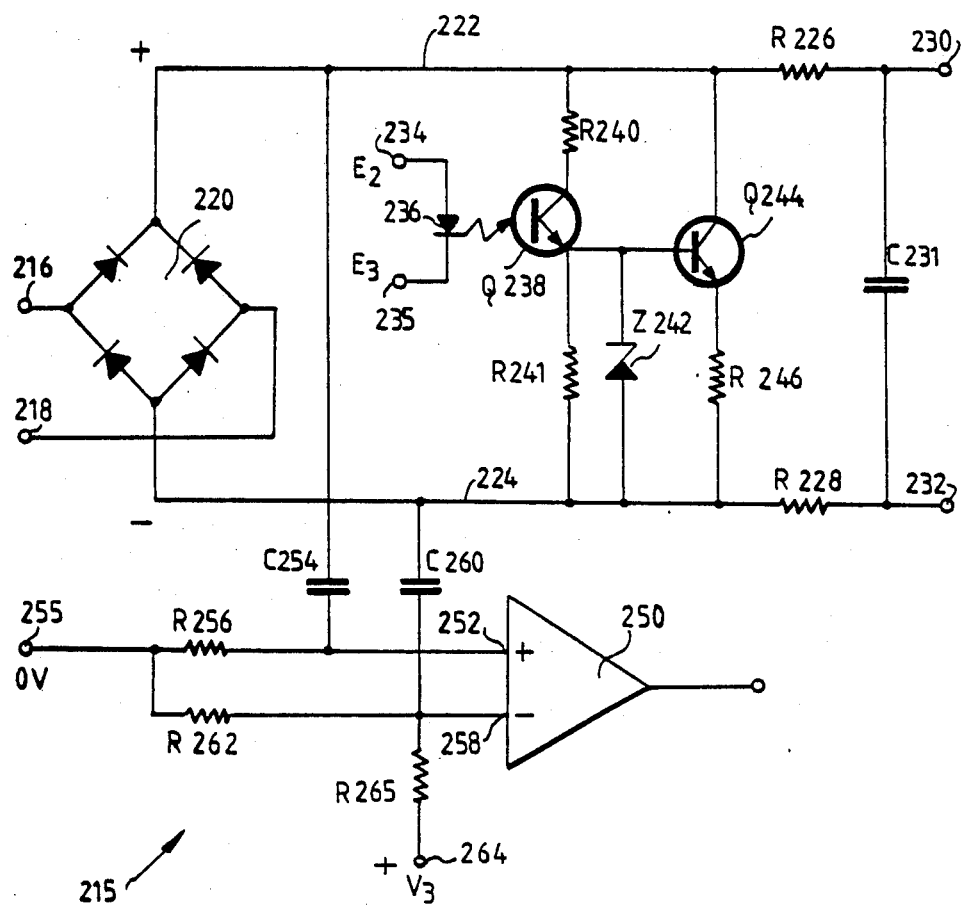
FIG. 5 is a diagram indicating circuits within a local station which can be used for application of the invention.

The receiver section (215) of a local station is shown in FIG. 5. It includes two terminals (216) and (218) which can be connected to a telephone line or pair which supplies power for two wires (222, 224) through a diode bridge (220). Within this circuit, there are two series-connected resistors ($R_{226}$, $R_{228}$) which are comparable to the resistors identified as ($R_{60}$) and ($R_{66}$) (FIG. 2), situated between the terminals identified as (230) and 232), where a power converter for the local station and a by-pass capacitor ($C_{231}$) can be parallel-connected.

The control signals for transmitting impulses are fed to the terminals (234, 235) of an electroluminescent diode (236) which is situated opposite a photosensitive transistor ($Q_{238}$) whose collector and emitter are respectively connected to the lines identified as (222) (positive outlet for the rectifier, 220) and (224) (negative outlet for the rectifier) by means of resistors identified as ($R_{240}$) and ($R_{241}$). A Zener diode ($Z_{242}$) which is parallel-connected to one of the resistors (241) maintains the voltage for the base of a transistor ($Q_{244}$) at a specific level whenever the photosensitive transistor ($Q_{238}$) becomes conductive as a result of light impulses. The previously mentioned transistor ($Q_{244}$), whose emitter is charged by means of a resistance identified as ($R_{246}$), is mounted between the wires (222, 224) so as to permit draining of a current with a predetermined intensity for the duration of each light impulse.

In order to detect current impulses transmitted through the bridge (220) from the line terminals (216, 218), the positive inlet (252) of a differential amplifier (250) is connected to the line (222) through a capacitor ($C_{254}$) and through a terminal (255) with a reference voltage of 0 volts, by means of a resistor ($R_{256}$). The negative inlet (258) of the amplifier (250) is connected to the line (224) by a capacitor ($C_{260}$), to the reference terminal (255) by a resistor ($R_{262}$), and to a terminal with a positive potential (264) by a resistor ($R_{265}$). The resistance level obtained by parallel-connection of the resistors identified as ($R_{262}$) and ($R_{265}$) is equal to the level for ($R_{256}$) as a result of symmetry. The resistors identified as ($R_{262}$) and ($R_{265}$) therefore form a potential divider, whereby bias voltage is introduced between the inlets (252, 258) of the amplifier (250) so as to render it impervious to the direct component of pulse streams originating from the main station which pass through the diode bridge (220).

Hence, it is possible to obtain a means of communication between stations, particularly within a telephone exchange, whereby stations are connected by a line which can simultaneously ensure supplying of power and transmission of digital message units in both directions along the line. This system only contains relatively simple and inexpensive electronic components, and it does not rely upon transformers, nor upon complex interface sequences, for processing signals which are transmitted along the line. The entire system can therefore be produced with inexpensive miniaturized components, and the latter aspect represents an especially advantageous characteristic in view of contemporary microcircuitry technology.

Although the description pertains solely to a preferred version of the invention, it is obvious that modifications introduced within the same context by technically knowledgable persons would not constitute a departure from the intent of the present invention.

Specifically, it is known that alternating or simplex communication between a main station and a local station, in the form which has been described heretofore, is limited by the length of the line connecting the two stations, on account of the propagation time which is required for sending an initial group of message units in one direction, and a second group in the other direction. According to specific line lengths, it is necessary to provide simultaneous or duplex communication. In this instance, an anti-local circuit, namely a self-adapting circuit of the echo suppression type, can be appropriately incorporated within the communication module for each station on the telephone line.

I claim:

1. A main station for a communications system having multiple local stations, said main station having two conductors connected to respective wires of a line connecting each main station with the local station, characterized in that the main station includes connecting components for connection of a power source to the line to provide direct supply voltage between said two conductors, two impedances respectively connected in series with said connecting components and said two conductors, two unipolar impulse senders respectively connected to said two conductors and connected to a common control signal source, said impulse senders including means for transmitting symmetrical unipolar impulses which increase the supply voltage between said two conductors, said impulse senders being connected to said conductors at points between said impedances and said wires, respectively, and a detector having means for detecting symmetrical unipolar impulses received from said wires and polarized in opposition to the direct supply voltage between the conductors.

2. A communications system of the type which comprises a main station, a local station, a line which connects said main station and said local station and which consists of a single pair of wires for providing direct power supply current to said local station from the main station, at least one current generator connected to said line at one of said stations for introducing digital signal to said line, and at least one detector connected to said line at the other of said stations for detecting digital signals transmitted along the line, characterized in that the current generator comprises means independent of said direct power supply current for generating the introduced digital signals as groups of unipolar current impulses which change the voltage between the wires of the line without substantially reducing the power supply voltage between said wires, said current generator is directly connected to said line, and the detector comprises means for detecting changes in line voltage.

3. A system in accordance with claim 2, characterized in that the digital signals are transmitted in the form of unipolar electrical impulses of one polarity along one of said wires of the line and corresponding unipolar electrical impulses of the opposite polarity along the other of said wires, the impulses of one polarity having the same amplitude as the impulses of the opposite polarity.

4. A communications system of the type which comprises a main station, a local station, a line which connects said main station and said local station and which includes at least one pair of wires for providing direct power supply current to said local station from the main station, at least one current generator connected to said line at one of said stations for introducing digital signals to said line, and at least one detector connected to said line at the other of said stations for detecting digital signals transmitted along the line, characterized in that the current generator comprises means for transmitting along the line the introduced digital signals as groups of unipolar impulses which change the voltage between the wires of the line without substantially reducing the power supply voltage between said wires, and the detector comprises means for detecting changes in line voltage, and wherein said system is for transmitting groups of impulses in both directions along the line and is characterized in that the main station includes a current generator having means for transmitting to the local station the introduced digital signals as groups of unipolar impulses which modify the voltage between the wires of the line in one amplitude sense, and the local station includes a current generator having means for transmitting to the main station introduced digital signals as groups of unipolar impulses which modify the voltage between said wires in the opposite amplitude sense, with each station also including a detector and means for connecting the detector to the line and for preventing the detector from being affected by impulses originating from the current generator of the same station, and further characterized in that said local station has a rectifier unit having means for passing direct current along said line to said local station in a predetermined direction regardless of the polarity of the direct current on the wires of the line, and in that said senses of modification of voltages depend upon the direction in which said rectifier unit passes direct current.

5. A communications system of the type which comprises a main station, a local station, a line which connects said main station and said local station and which includes at least one pair of wires for providing direct power supply current to said local station from the main station, at least one current generator connected to said line at one of said stations for introducing digital signals to said line, and at least one detector connected to said line at the other of said stations for detecting said digital signals transmitted along the line, characterized in that the current generator comprises means for transmitting along the line the introduced digital signals as groups of unipolar impulses which change the voltage between the wires of the line without substantially reducing the power supply voltage between said wires, and the detector comprises means for detecting changes in line voltage, and characterized in that each station has one of said current generators and one of said detectors, in that each wire is series-connected in each station to an impedance situated before the point where impulses are introduced to the line at that station, in relation to the direction in which transmission of such impulses along the line occurs at that station, and situated beyond the point where impulses are detected at that station, in relation to the direction in which reception of impulses along the line occurs at that station, and further characterized in that the impedances are resistors with resistance values substantially equal to half of the characteristic impedance of the line.

6. A communications system of the type which comprises a main station, a local station, a line which connects said main station and said local station and which includes at least one pair of wires for providing direct power supply current to said local station from the main station, at least one current generator connected to said line at one of said stations for introducing digital signals to said line, and at least one detector connected to said line at the other of said stations for detecting said digital signals transmitted along the line, characterized in that the current generator comprises means for transmitting along the line the introduced digital signals as groups of unipolar impulses which change the voltage between the wires of the line without substantially reducing the power supply voltage between said wires, and the detector comprises means for detecting changes in line voltage, and characterized in that each station has one of said current generators and one of said detectors, in that each wire is series-connected in each station to an impedance situated before the point where impulses are introduced to the line at that station, in relation to the direction in which transmission of such impulses along the line occurs at that station, and situated beyond the point where impulses are detected at that station, in relation to the direction in which reception of impulses along the line occurs at that station, and further characterized in that the impedances at the main station are thermistors with positive temperature coefficients.

* * * * *